United States Patent [19]

Perkins

[11] 4,241,868
[45] Dec. 30, 1980

[54] FLUID TEMPERATURE MIXING INDICATOR

[76] Inventor: Jean K. Perkins, P.O. Box 10-1869, Anchorage, Ak. 99511

[21] Appl. No.: 950,689

[22] Filed: Oct. 12, 1978

Related U.S. Application Data

[63] Continuation-in-part of Ser. No. 799,148, May 23, 1977, abandoned.

[51] Int. Cl.³ ..................... G05D 23/00; G05D 11/00
[52] U.S. Cl. .................................. 236/12 A; 236/94; 137/90; 137/551
[58] Field of Search ................ 236/12 A, 94; 137/90, 137/551, 552

[56] References Cited

U.S. PATENT DOCUMENTS

| | | | |
|---|---|---|---|
| 1,636,698 | 7/1927 | Leonard et al. | 236/94 UX |
| 1,772,279 | 8/1930 | Fonseca | 236/94 UX |
| 3,721,386 | 3/1973 | Brick et al. | 236/12 A |
| 3,927,571 | 1/1974 | Athey | 73/362 |

FOREIGN PATENT DOCUMENTS 2608995  4/1977  Fed. Rep. of Germany .......... 137/551

Primary Examiner—William E. Wayner
Assistant Examiner—Harry B. Tanner
Attorney, Agent, or Firm—Sanford Astor

[57] ABSTRACT

This invention relates to a system to provide a controlled temperature mixing of two or more fluids by an immediate visual indication of necessity for particular adjustment, and achievement of a predetermined fluid blend temperature range. The device includes plumbing fixture apparatus comprising a set of manually controlled hot and cold fluid mixing valves and an integral fluid flow activated temperature sensor with electronic translation of fluid temperature imbalances between sensed blended fluid temperature and predetermined temperature values. A fluid temperature imbalance will cause illumination of a particular fluid control valve handle or handles to acknowledge and obtain corrective fluid temperature control by manually adjusting the fluid control valves until the proper fluid blend temperature range is achieved.

14 Claims, 10 Drawing Figures

FLUID TEMPERATURE MIXING INDICATOR

This application is a continuation in part of my co-pending Application Ser. No. 799,148 filed May 23, 1977, now abandoned.

BACKGROUND OF THE INVENTION

There exists marketed devices which gauge or indicate temperature of the water flowing from a common faucet. All such devices exhibit the same problem in that the temperature must be translated from mechanical scales by the operator and provide no guided decisions for adjustment. Temperature is interpreted by reading a temperature scale and therefor the reading of the temperature is subject to error. The public, including children, the aged, and those of limited mental capacity have difficulty in reading such scales of temperature and mistakes can be easily made. Existing systems provide no direct positive feedback to the operator on which temperature control valve adjustment is required to achieve a desired fluid temperature range. Prior mechanical methods also require in-line attachment to a fluid source and many units are too sophisticated for ease of operation and calibration. Mixing valves with integral mechanical temperature scales appear in U.S. Pat. Nos. 2,171,992 and 3,960,016 and embody the general style of mechanical temperature sensor combined with control valves.

It is well known that electronic temperature sensing devices, such as thermistors, have replaced the bulb and bimetalic mechanical indicators. Electronic temperature devices are accurate, reliable and easy to signal translate into a variety of display indications, especially digital readouts. Examples of these devices are related in U.S. Pat. Nos. 3,494,196, 3,857,285 and 3,927,571. All of these patents employ resistive electronic temperature sensing which is translated and displayed by various techniques standard to the art. The devices mentioned above may include two or more signal indicators, with only one illuminated to display the intended temperature condition. However, said patents do not relate any device or fixture which directly indicates the need for particular control adjustment of a fluid mixing valve to achieve a preset fluid temperature blend. Further, neither of the disclosed methods, mixing valves with mechanical temperature indications or electronic temperature sensing contains method, means or apparatus for determining and communicating appropriate adjustment for a single or several fluid valves to achieve a proper fluid temperature range and temperature blend ratio.

These prior patents fail to disclose any fluid temperature sensing and mixing control device either mechanical or electrical which is responsive only when fluid flow is present at the sensing element. Prior art exists in fluid flow switches both mechanical and electrical with various signal translations, such as analog and digital, but such devices are concerned with flow rate or fluid content rather than conservation of electrical power in a temperature blending adjustment apparatus which in its most practical form must operate from a limited life current source such as batteries. Further, without determining flow, a great hazard exists to all such devices by presenting false or misleading readings which inturn may cause improper indications of the need for adjustment with degradation of the circuitry due to continuous operation.

SUMMARY OF INVENTION

In its broadest aspects the object of the apparatus of this invention provides for simple and accurate indication of fluid control valve adjustment to obtain a proper fluid temperature and fluid temperature mixing blend.

A further object of the invention is to provide a device which assists the operator in adjustment of the fluid mixing valves to achieve the desired predetermined blended fluid temperature range.

Another object is to achieve needed mixing valve adjustment indications only when fluid flow is present at the discharge, the advantage being to eliminate false or misleading indications and to increase the active life of a low capacity power source such as a battery.

It is also accordingly an object of the invention to provide within the apparatus a means by which illumination of the mixing control handles can be altered thus allowing use in both high and low ambient lighting conditions. This feature is a requirement intended to preclude visual loss of control indications in bright environments, such as sun light, while providing reduced and pleasing visual perception in darkened areas or at night.

Yet a further object of the invention is to provide a device utilizing simple lights as indicator elements to signify correct and incorrect fluid temperature ranges and to indicate which valve must be turned to achieve the proper range. Properly used the device will assist the operator in avoiding the possibility of being subjected to unsafe conditions of burning, scalding or extremely cold fluid temperatures.

In particular, a visual display of the necessity for mixing valve adjustment would provide an assistance to the public, to children, to an elderly person, and to those with problems of sensory loss. Some typical usages would be for multiple mixing valves, as in home or industrial lavoratory type faucets, shower installations, and anywhere preset desired fluid temperature blends are required. In addition, it is contemplated that the unit can easily provide external signals which would activate electrical fluid control valves for control of the fluid system if preset fluid temperatures are exceeded.

The device contains no moving parts therefor it is not subject to mechanical wear or breakdown. The unit utilizes low power electronic circuitry consisting of resistive sensor elements, a quad comparator and associative drive circuitry to provide illuminating output and an external outlet for additional controls.

BRIEF DESCRIPTION OF THE DRAWINGS

The objects described above, as well as other objects will be obvious from the following description and the drawings in which.

DESCRIPTION OF THE PREFERRED EMDODIMENT

Figure 1:
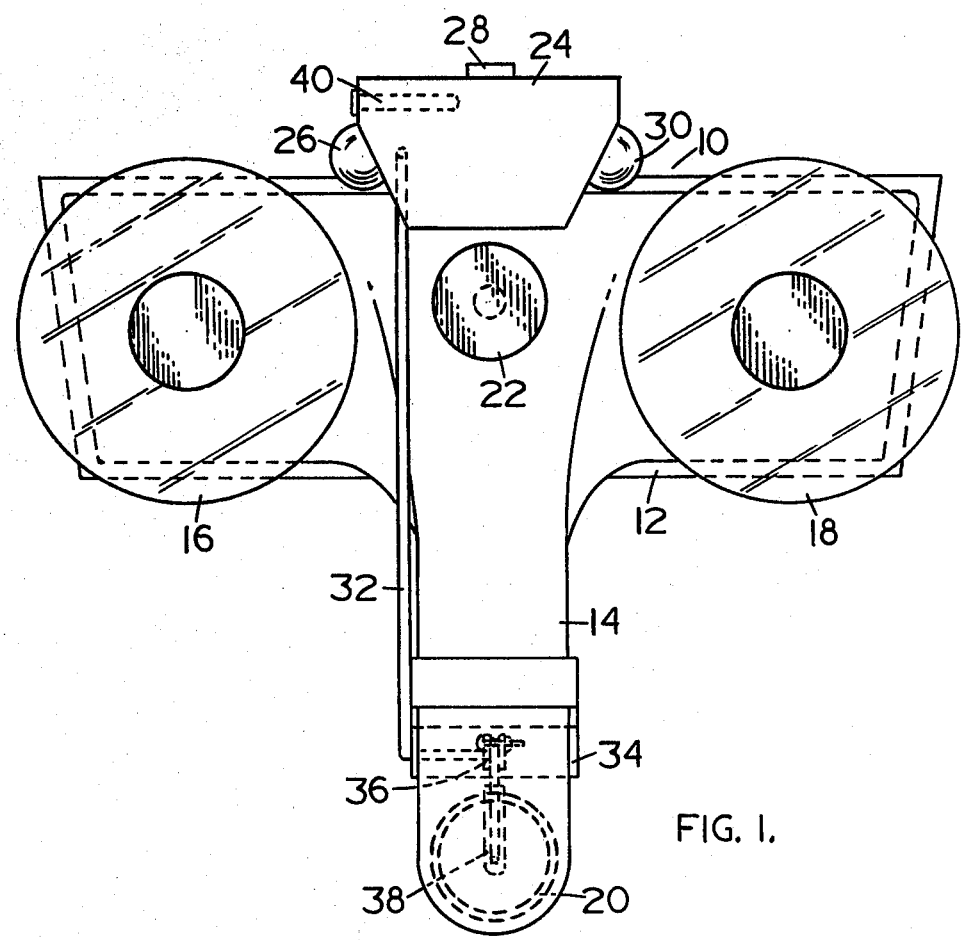
FIG. 1 is a plan view of the external device of the present invention.

Referring now to FIG. 1 there is shown a typical standard household commercial fluid or water faucet 10 consisting of the sink base connection portion 12 and the outspout 14. There is also shown the hot water control handle 16 and the cold water control handle 18. The water after passing through the outspout 14 exits through nozzle 20. The sink plug handle 22 is shown on the center of the sink attached portion 12. An indicating signal means consisting of control box 24 containing the electronics to operate the device of the present invention is shown at the rearward portion of the sink connector portion 12. Also shown are external indicator element bulbs 26 and 30. An illumination adjustment switch 28 is provided to select and regulate current flow to said bulbs 26 and 30 to achieve satisfactory visual preception. A sensor probe 32 which is connected internally of box 24 to the electronic components therein passes along side the outspout 14 and is fixedly attached at point 36 by a holding strap 34.

The sensor device 32 is bent at right angles at point 36 so that it can pass underneath the outspout 14. The temperature sensitive and fluid flow switch tip 38 is then extended underneath the outlet nozzle 20 so that the fluid discharge of the sink faucet device passes over the temperature sensitive measuring device and flow switch in tip 38. The resistance state of the temperature sensing device and the flow switch are then passed via wires contained within the probe 32 to the electronics contained in box 24.

An outlet jack 40 is provided in the event that it is desired to attach to the unit a fluid control valve mechanism which is not shown in the drawing. This mechanism would be attached at a point somewhere below the faucet 10 in the fluid inlet lines. In the event the temperature of the fluid exceeded either too high a temperature or too low a temperature, depending upon the need of the user, the fluid control device acting on a conditioned signal from the unit would immediately reduce or shut off the flow of fluid. This device could be plugged into the electronics in box 24 through outlet jack 40.

The device operates as follows: The operator adjusts fluid valves 16 and 18 in a random mixture that he feels would achieve a desired temperature and flow rate. As the fluid gradually comes into the faucet and reaches its flow pressure and temperature, the flow is detected by a decrease in resistance across the flow switch probe elements 38 which activate additional electronic circuits in box 24 by means of an interconnecting cable contained within the sensor probe 32. The activated circuit then samples the fluid temperature flow by means of the sensory probe 32 and a temperature sensitive element at 38. The electronics in box 24 are preset so that if the resulting actual fluid temperature exiting from discharge outlet nozzle 20 is within a certain fluid temperature range, which is normally preset, bulb 26 and 30 will light indicating that a proper fluid temperature blend has been reached. The preset range can be modified as later explained.

If the fluid exiting from outlet nozzle 20 for instance, is too hot then bulb 26 will light and bulb 30 will remain off indicating by handle 16 illumination that the fluid is hot and requires cold valve adjustment to obtain illumination of the cold valve handle 18 to make the exiting fluid cooler. In the event that fluid exiting from outlet nozzle 20 is too cold, bulb 30 will light up indicating by illumination handle 18 and bulb 26 will extinquish, further requiring handle 16 to be adjusted until handle 16 is illuminated. Once the desired temperature balance has been reached bulb 26 and bulb 30 will both light indicating no further adjustment of valve handles 16 and 18 are required. Both bulbs can remain on so long as the desired fluid temperature range is maintained and fluid flow is present or until internal timing electronic circuits cause a recycling.

Figure 2:
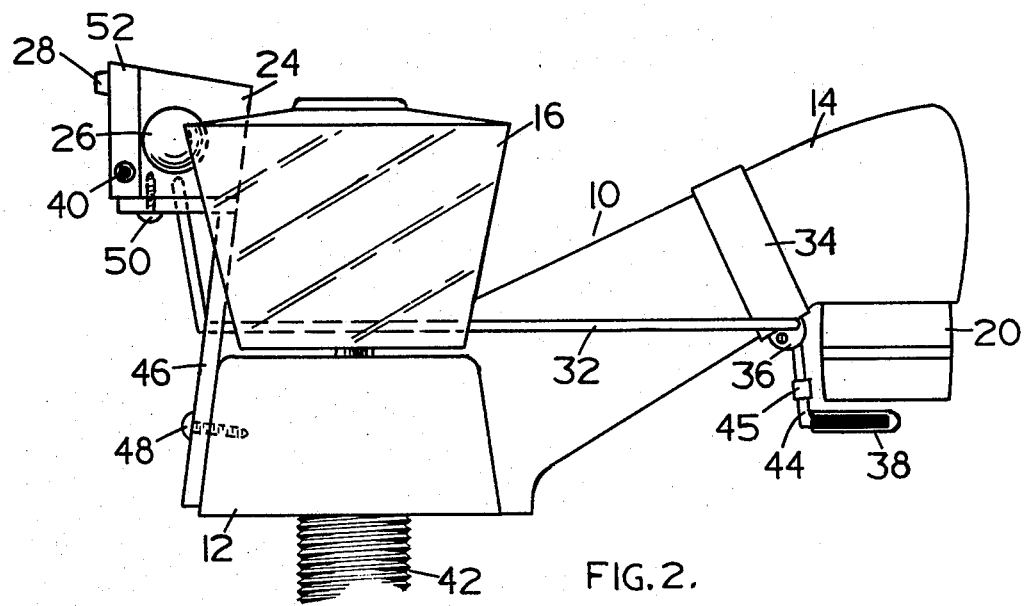
FIG. 2 is a side view of the external device of the present invention.

Referring now to FIG. 2 there is shown the faucet 10 of the present invention with hot water handle 16; the outspout 14 comes from the sink attachable portion 12. There is shown an incoming hot water line 42 in which the hot water with a similar line for the cold water passes into a mixing valve not shown which mixes the hot and cold water and passes it through outspout 14 and into outlet nozzle 20. The temperature and fluid flow sensor probe 32 passes alongside the outspout 14 and is held securely to it by band 34. It passes underneath outspout 14 at point 36 and then passes downwardly by arm 44 so that it may then turn underneath nozzle 20. The tip 38 extends underneath the valve so that the water passes over tip 38 as it exits. The tip 38 threadably attaches at point 45 to the probe 32.

Control box 24 is mounted onto the rear of the faucet device 10 and the sink attachable portion 12 by an L shaped bracket 46 which is fixedly attached to the sink portion 12 by any convenient device such as a screw or bolt 48. Another screw or set of screws 50 attaches the box 24 to the bracket 46. The bulbs 26 and 30 are shown on box 24 as well as the outlet jack 40 and illuminaton switch 28. Box 24 has a back plate 52 which may be removed for changing, adjusting or fixing the electronics within the box 24.

The embodiment just described may be attached to any existing sink faucet in a house or in a commercial business and it is also utilizable on those faucets which have only one handle to adjust the temperature as well as those which have two handles. The bulb indicator elements would still indicate in which direction to adjust the single handle to achieve the proper water temperature.

Further it is contemplated that bulbs 26 and 30 may be internally reversed so as to show by direct illumination of a particular handle 16 or 18 that adjustment is required, said actions remain at the operators discretion.

Figure 3:
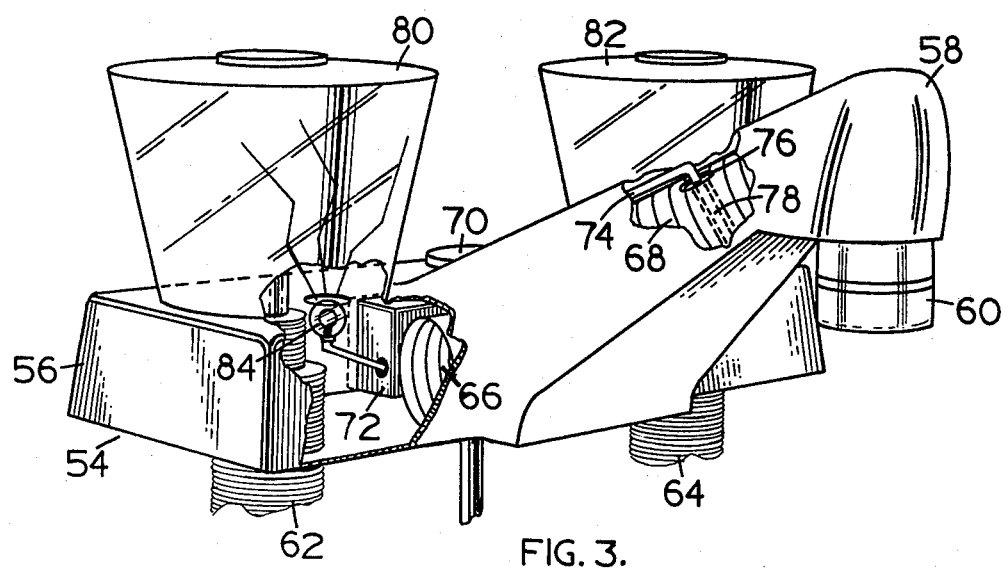
FIG. 3 is a perspective view of the internal device of the present invention.

FIG. 3 will describe how the indicating signal means will be mounted onto a new faucet internally so that the entire device is contained within the faucet itself.

Referring now to FIG. 3 there is shown a typical sink faucet 54 with sink attachable portion 56 and a spout 58 and an exit nozzle 60. An inlet hot water line 62 and an inlet cold water line 64 carry the water into the faucet where they are ultimately mixed in a mixing valve 66; only a portion of which is shown. The water then passes into the spout 58 through a pipe 68 which passes up the center of the decorative outer shell and then ultimately out exit nozzle 60. The sink plug control handle 70 is shown on the middle of the sink attachable portion 56. The electronics of the present invention are contained in a control box 72 which is now internal to the sink attachable portion of the faucet 54. It is fixed into the faucet by any convenient means such as bolting. The sensor probe 74 extends out of the control box 72 and up along side exit pipe 68 in the spout portion 58. At a given point near the end of exit pipe 68 a hole 76 is made in the pipe and the temperature sensing device is placed through hole 76 so that the flow switch and temperature sensitive tip 78 probe extends directly into the fluid exit pipe 68. The hole 76 is then sealed by any convenient known means such as sealing rings.

The valve adjustment bulb indicator elements may now be placed internal to the device by having the fluid control handles, such as, the hot water control handle 80 and the cold water control handle 82, made of a clear or luminescent material such as plastic. In this way the bulb 84, which indicates that the water is too hot and cold water must be applied, may be placed internal to the faucet and when bulb 84 lights up it can be seen lit through handle 80. A bulb also exists underneath the cold water handle 82 so that when the water is too cold further hot must be applied and therefore the cold water handle 82 will be illuminated and handle 80 adjustment will be required to achieve illumination of bulb 84.

When the temperature and flow of the water is correct the adjustment indicating bulbs 84 and bulb under handle 82 illuminate through handles 80 and 82 visible to the user. Thus, the device works in the same way as the external device shown in FIGS. 1 and 2 except that here the electronics and bulbs are placed internal to the faucet.

Figure 4:
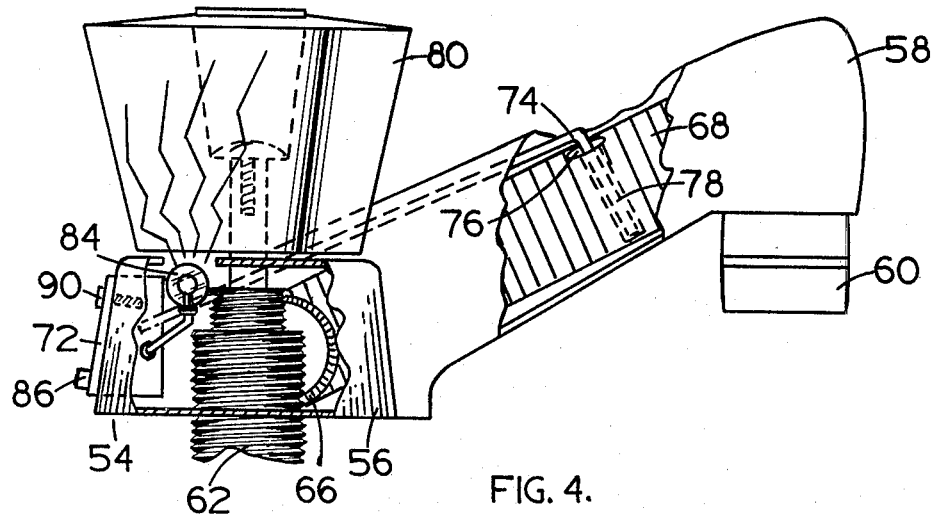
FIG. 4 is a side view, partially broken away of the internal device of the present invention.

Referring now to FIG. 4 there is shown the faucet device 54 with the sink attachable portion 56 and the spout 58 with exit nozzle 60. The inlet hot water line 62 brings hot water into the faucet where it is mixed with cold water in mixing valve 66. The water then passes out the exit pipe 68.

The sensing probe 74 extends from the control box 72 and passes through the hole 76 so that the flow switch and temperature sensitive tip 78 probe are directed into the path of the water coming through exit pipe 68.

The hot water handle 80 is attached to control the flow of hot water and, as stated, is of a clear or luminescent material so that the bulb 84 when lit can be seen through the handle.

The electronics contained in box 72 is fixedly attached within the faucet 54 by any convenient manner such as bolt 90. When the water reaches a correct temperature, bulb 84 and bulb under the opposite handle, not shown, will be lit and the operator will be able to tell immediately that the water temperature is now in the correct range.

An illumination adjustment switch 86 is provided to select and regulate current flow to said bulb 84 and the bulb located under the opposite handle to obtain satisfactory visual perception.

it is obvious from viewing the description of the invention that the bulbs or light emitting indicating elements which indicate too high a temperature or too low a temperature or the correct temperature range can be replaced by audio signals for those persons who, because they are either blind or because they have very poor vision, cannot view the lighted bulb. These audio signals can be of different pitches to indicate whether more hot or more cold is required or the temperature range is proper. In this device the entire electronics would be inside control box 72 so that no separate audio devices need to be placed on any external portions of the faucets. There is another instance however, in which you are dealing with a person who is both blind and deaf and in this instance it may be possible to replace the indicator devices with vibrational devices which would be placed within each of the handles indicating that the handle had to be adjusted to correct the temperature imbalance or a vibration mechanism in the faucet itself so that a person feeling the various portions of the faucet will be able to tell before he placed his hand underneath the faucet that the fluid was within a proper temperature range.

Figure 5:
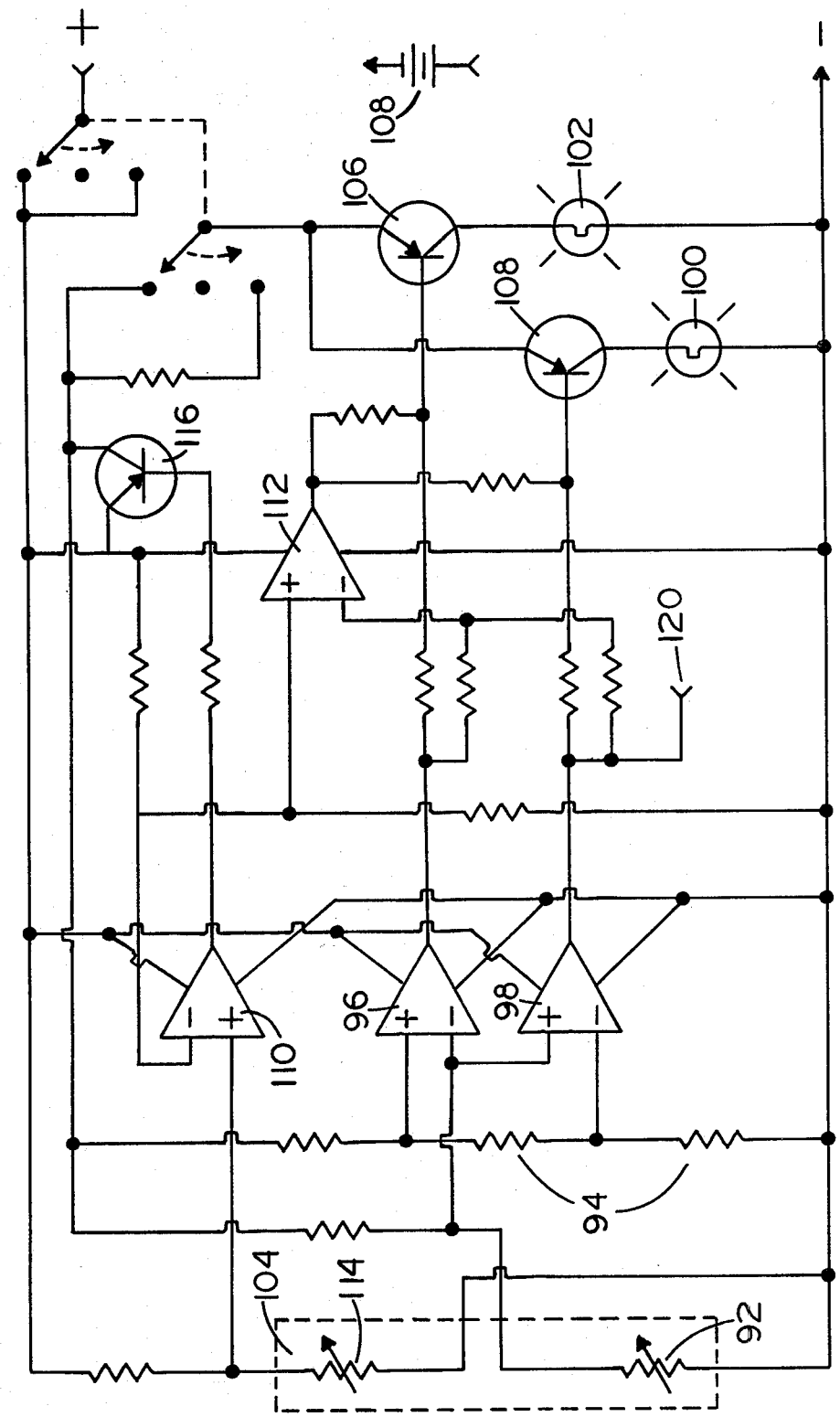
FIG. 5 is a schematic diagram of the electronics of the present invention.

Referring now to FIG. 5 there is shown a schematic of the indicating signal means of the present invention. The apparatus consists of four basic units; a sensor device, a quad comparator, indicator elements and a power source. The sensor is a two element device that changes resistance according to the temperature applied to its surrounding glass envelope and detects, by means of a lowering of resistance, a fluid flow between two exposed probe tips. In the case of the flow detector changes in resistance vary a voltage at the sense input of a single element of the quad comparator which acts as an electronic switch to allow activation of a medium current switching transistor which supplies the source current for the temperature sensing comparators and associated switching transistors for bulb illumination. A temperature sensing element, commonly a thermistor, is placed in common with the sensed inputs of two more sections of the quad comparator, each having a different sense polarity to which changes in the sensor resistance cause voltage changes to appear. These changes are within a referenced voltage range and are electronically interpreted by the comparator circuitry. The center of desired indicating temperature and maximum threshold switching points is set by a single common voltage divider reference source. The output of said comparator is a direct result of either achieving or failing to achieve a proper voltage at its input. The output signals are individually applied to an output drive circuit to produce conditions which are presented to the operator as display indications of needed valve adjustment to meet different temperature ranges. These in the broadest sense correspond to increase cold, increase hot and no adjustment needed of the faucet handles. These indications, when properly placed in a relationship to manual valves indicate which valves must be adjusted to achieve the desired temperature.

Referring to FIG. 5, the fluid flow sensor 114 comprising two special metallic probes translate fluid flow in terms of a lowering of resistance across the elements. Such a device is not common but easily constructed from non-corroding wires spaced appropriately apart. Signals from said device appear at comparator 110 and are translated into activating switching transistor 116 a common medium current P-N-P silicon device, which in turn serves as a source for the temperature and indicator sections.

The resistive sensor element 92 is a solid state temperature sensing resistor encapsulated in hard glass. These devices are well known such as the sensor resistor sensor commonly manufactured.

The range selection resistors 94 are preset to give a desired temperature range at which bulb signals will be activated. This range may be modified by changing the resistance value at 94 or by the use of a variable resistor or adjustable potentiometer so that the user may modify the range himself.

Temperature comparator circuits contain three comparator units, 96, 98, and 112, commonly called LM339, produced by numerous sources. Under low power drain operation these may be substituted with typical CMOS comparator equivalents. The output of said devices are applied to switching transistors 106 and 118, typically medium current P-N-P silicon devices commonly available. Indicator bulbs or light emitting sources 100 and 102 provide indications of necessary faucet handle adjustments. Communication of decoded outputs for external control are obtained by outlet jack 120. Indicator element current limiting resistor 122 in series with the power source battery 108 is manually selectable to adjust indicator illumination levels achieving satisfactory visual preceptions during high and low ambient lighting conditions.

The power source can be battery 108 or standard laboratory output supply and requires very little current drain because of the employment of low power integrated circuit devices.

Figure 6:
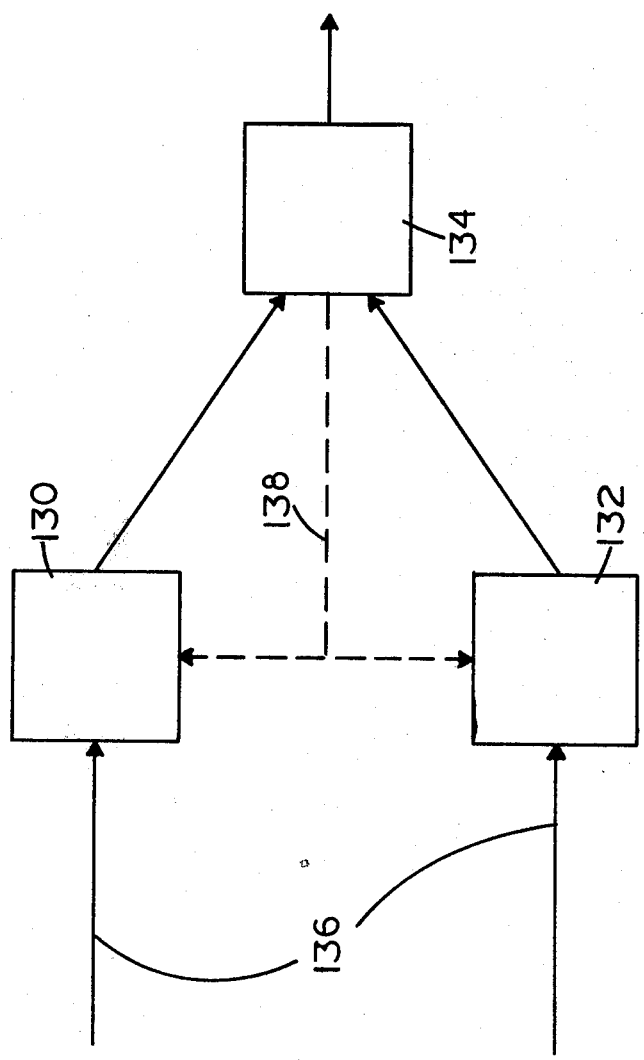
FIG. 6 is a block diagram of the external fluid control circuitry of the present invention.

Referring to FIG. 6, there is shown a block diagram of an external fluid flow control mechanism which is actuated by the electrical condition of said comparator signal outputs. The condition of said comparator signals actuates electromechanical valves 130 and 132 situated in the flow lines 136 of the fluid supply to said plumbing fixture 134. The said comparator signals 138 are derived by means of an inlet jack contained in the plumbing fixture 134 and are previously described.

Figure 7:
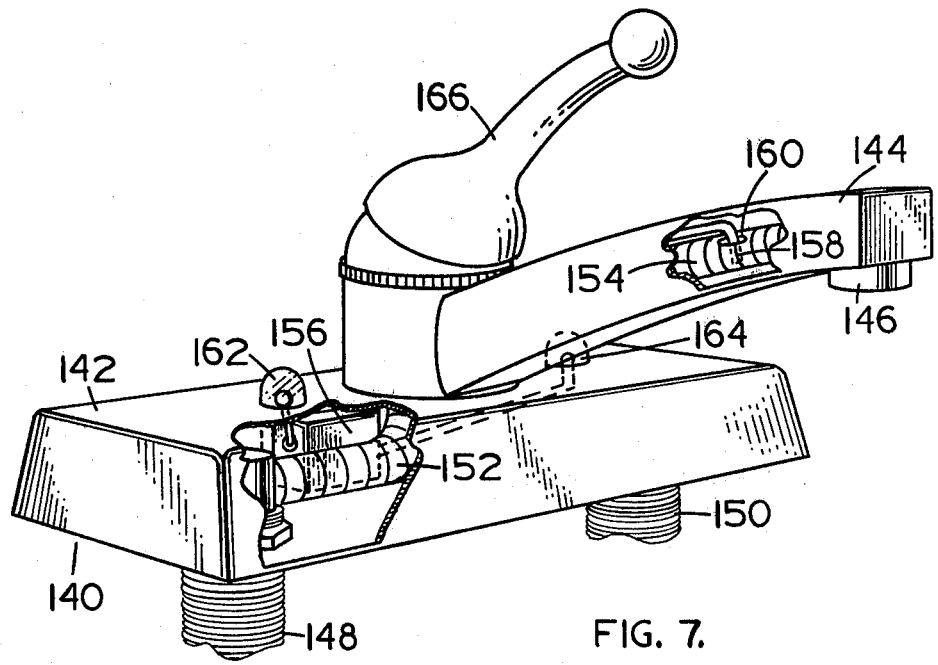
FIG. 7 is a view of the internal device as used with a single handled mixing control valve of the present invention.

FIG. 7 represents use of the present invention with a typical single handle mixing control valve faucet 140, with sink attachable portion 142 and swing spout 144 and an exit nozzle 146. The inlet hot water line 148 and an inlet cold water line 150 allow fluid flow into the faucet device where they are combined and flow controlled by mixing valve 152; only a portion of which is shown. The fluid flow then passes into a pipe 154 and out the swing spout 144 by means of exit nozzle 146. The indicating signal means of the present invention are contained in a control box 156 internal to the sink attachable portion 142 of the faucet. The sensor probe 158 extends out of the control box 156 to the swing spout 144 where hole 160 permits access to fluid flow in pipe 154.

Control box 156 contains the electronics to operate the device of the present invention and is shown at the rearward position of the sink attachable portion 142. Lighted bulbs 162 and 164 are attached to the control box 156 and extend through sink attachable portion 142.

Fluid flow temperature control is achieved by means of rotating single handle mixing control valve lever 166 in the direction of illumination from either bulb 162 or 164.

Figure 8:
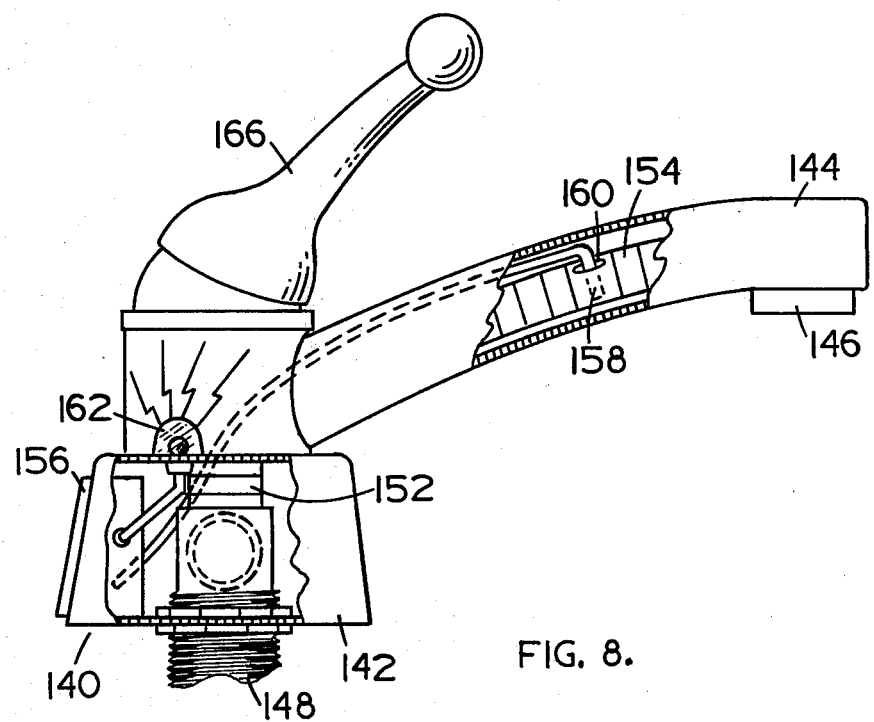
FIG. 8 is a side view, partially broken away, depicting the internal device in a single handled mixing control valve of the present invention.

Referring now to FIG. 8 there is shown the faucet 140 of the present invention with a single mixing control valve lever 166 and a swing spout 144 extending from the sink attachable portion 142. There is shown an incoming hot water line 148 in which hot water passes into a mixing valve control 152 with a similar line for the cold water. The fluid flow then passes through faucet swing spout 144 and into exit nozzle 146. The sensing probe 158 extends from the control box 156 and passes through hole 160 in fluid pipe 154 to permit flow switch and temperature sensitive tip probe 158 to be directed into the fluid flow. Control box 156 is mounted internally and attaches to lighted bulbs 162 and 164; not shown.

Figure 9:
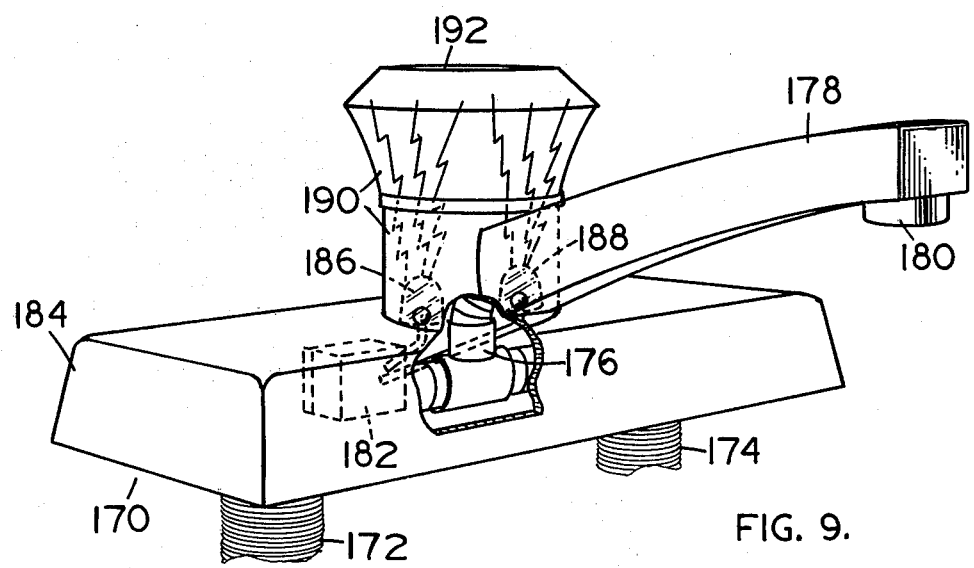
FIG. 9 is a perspective view of the internal device in a single handled mixing control valve of yet another type.

FIG. 9, is a view of the present invention used with a single handled mixing control valve 170 so as to be mounted and contained entirely within the faucet itself. The hot water inlet line 172 and a cold water inlet line 174 allow fluid to pass into mixing control valve 176; only a portion of which is shown. Water then passes into swing spout 178 and then ultimately out exit nozzle 180. An indicating signal means consisting of control box 182 is housed internally in sink attachable portion 184, and lighted bulbs 186 and 188; only one shown, extend from said control box 182, placed internal to the mixing control valve handle 190. When either bulb, 186 or 188, illuminates it can be seen through the faucet handle lever 192; a clear or luminescent material such as plastic. Two bulbs of two different colors, for example red and yellow, red (too hot), yellow (too cold) can be utilized and when both come on yet a third color is formed, orange, the temperature is in the correct range. Thus, the device works in the same way as shown in FIGS. 3 and 4, except that only one valve control handle is used.

Figure 10:
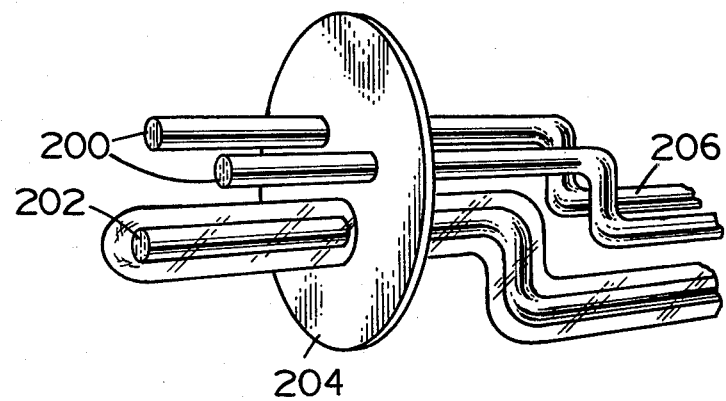
FIG. 10 is an enlarged view of the temperature sensing and fluid flow sensing elements of the present invention.

Referring now to FIG. 10; an enlarged view of the temperature sensing and fluid flow sensing element of the present invention. The fluid flow sensor 200 consists of two special metallic probes, aligned in parallel and separated by a determined distance. The temperature sensitive resistor element 202 is mounted in conjunction with the fluid flow sensor 200 upon a fluid sealing ring 204. Electrical wires 206 transfer resistive readings to the control box of the present invention, which is not illustrated.

Having described the invention herein as the preferred embodiment, it is to be clearly understood that this description is made only by way of example and not as a limitation to the scope of the invention. Further, the inventor is entitled to the broadest sense of the claims contained herein and, many other modifications and variations of the present invention are possible in view of the above teachings. Different arrangements of indicator element bulbs 100 and 102 may prove more effective, additional valve adjustment lamps may be instructive or valve lamp color arrangements preferable in a single element. Also, the invention is applicable to single element mixing valves as well as the standard two control valve systems. Still other alterations may be apparent to persons skilled in the art from the described claims and description.

What is claimed is:

1. A plumbing fixture device comprising; an apparatus of fluid valves having control handles to control and combine hot and cold fluids, an encompassing valve body to include fluid inlets and mixing chamber with an outlet for emitting fluid discharge, and an indicating signal means acting as an integral part of said fixture which determines and communicates the acknowledgment and exacting corrective control needed to achieve preset fluid temperature ranges, said indicating means comprising an electronic signal converting comparator circuit which translates sensed fluid flow and fluid temperatures into predetermined electrical indications, said comparator circuit providing a condition of signal output which is dependent upon fluid discharge temperature and the presence of a fluid flow signal, said comparator circuit being a first and second comparator, each having a separate input of opposite sensing polarity connected in common to the output of a voltage dividing temperature sensitive resistor element placed in the fluid discharge path and a separate sensing input attached to a single voltage dividing reference source which determines both center of a desired indicating temperature range and maximum threshold width from the center of the indicating temperature range, the output of said first and second comparator circuits activating separate and parallel switching transistors that in turn provide a source of current to illuminate bulb indicator elements at control handles according to input signal amplitude, a third comparator having a separate sensing input connected to said first and second comparator outputs by suming resistors with a separate second sensing input attached to a preset voltage reference source which provides an output action when a condition of said circuitry is that both first and second temperature detecting comparators are in a non-conducting state indicating fluid temperature balance has been achieved, said output action from the third comparator providing a signal to both said switching transistors to illuminate indicator elements at all control handles indicating no further need for valve control handle adjustment and that proper fluid temperature has been achieved, activation and operation of all said temperature detecting comparators and described circuits being dependent upon a fluid flow switch consisting of an exposed resistance element placed in the fluid discharge path whereby another comparator translates the sensed fluid flow resistance into a switched source of current to the said temperature detecting comparators and described circuitry, said indicating signal means comprising said temperature detecting comparators and circuitry, which communicates an imbalance of the sampled fluid temperature occuring during active fluid flow and in relationship to a predetermined temperature range, said indicating signal device indicating one or more particular corrective actions to achieve a proper fluid temperature range by manual adjustment of fluid control valves as directed by indicator elements at control handles.

2. The device of claim 1 wherein the indicator elements are illuminating components such as filament lamps or light emitting diodes.

3. The device of claim 2 wherein illumination of said indicators are in direct arrangement to fluid valve control handles depicting the necessity for specific valve adjustment to achieve a desired temperature range.

4. The device of claim 3 wherein radiant illumination is cast upon the valve control handle.

5. The device of claim 3 comprising a dispersed illumination projected into said control handle.

6. The device of claim 1 wherein the temperature sensor and fluid flow switch, consisting of a temperature sensitive resistor and a fluid resistance sampling element, is an integral assembly mounted in the discharge fluid flow path.

7. The device of claim 1 comprising temperature sensing and fluid flow sensing elements, low power consumption electronic conversion logic, indicators for control determination and a power source adapted to be used in connection with an ordinary faucet through which flows a controllable fluid.

8. The device of claim 1 comprising an indicating signal means that indicates stable achievement of fluid temperature range by a single illumination source or multiple illuminated sources.

9. The device of claim 3 which allows for the selection of the radiant illumination levels emitted from said indicator elements to achieve satisfactory visual perception during high and low ambient lighting by means of a current limiting resistor placed in series with the power source.

10. The device of claim 1 wherein said comparator circuits are voltage comparators.

11. The device of claim 1 comprising a single control mixing valve containing said indicating signal means wherein indications of control adjustment and attainment of a desired fluid temperature mixture may be achieved.

12. The device of claim 2 whereby the said illumination consists of colored emissions of light depicting need for control or attainment of proper fluid temperature blend.

13. The apparatus of claim 1 wherein said comparator signal outputs are supplied to an external fluid control device by means of an outlet jack wherein the electrical condition of said comparator signals control electromechanical valves which regulate fluid flow inline to the plumbing fixture inlet means.

14. The device of claim 13 wherein said external fluid control regulates discharge fluid blend temperature by said electromechanical valve means.

* * * * *